United States Patent [19]
Moogk

[11] 3,811,331
[45] May 21, 1974

[54] V-BELT DRIVING DEVICE
[75] Inventor: Friedrich Moogk, Sinn, Germany
[73] Assignee: E. & A. Becker KG, Maschinen-und Getriebebau, Sinn/Dillkreis, Germany
[22] Filed: Oct. 5, 1972
[21] Appl. No.: 295,291

[52] U.S. Cl............................................ 74/230.17 A
[51] Int. Cl............................................ F16h 55/52
[58] Field of Search............. 74/230.17 A, 230.17 C, 74/230.17 R, 230.17 B

[56] References Cited
UNITED STATES PATENTS

| | | | |
|---|---|---|---|
| 3,365,967 | 1/1968 | Moogk | 74/230.17 A |
| 2,751,790 | 6/1956 | Ingold | 74/230.17 C |
| 3,324,736 | 6/1967 | Bassoff | 74/230.17 A |
| 3,250,553 | 5/1966 | Detwiler | 74/230.17 C |
| R25,929 | 12/1965 | Quenberger | 74/230.17 C |
| 2,164,818 | 7/1939 | Heyer | 74/230.17 A |
| 3,656,359 | 4/1972 | Dors | 74/230.17 A |

Primary Examiner—Manuel A. Antonakas
Assistant Examiner—R. H. Lazarus
Attorney, Agent, or Firm—Hane, Baxley & Spiecens

[57] ABSTRACT

There is disclosed a variable speed drive for use with an asymmetric V-belt. The V-belt drive comprises a drive shaft and a driven shaft disposed in spaced apart parallel relationship. Each of the shafts seats a sheave consisting of two halves; one half of each sheave being seated on its shaft secured against rotation and axial displacement and the other half of each sheave being rotatable and axially displaceable on its shaft. The facing sides of the sheaves have different angles relative to the shafts thereby constituting asymmetric running surfaces for the V-belt used for transmitting the rotation of the drive shaft to the driven shaft. The axially displaceable half of each sheave is biased by a spring assembly toward the respective other half. The spring pressure can be adjusted by setting means thereby correspondingly varying the transmission ratio between the two shafts.

4 Claims, 3 Drawing Figures

V-BELT DRIVING DEVICE

The invention relates to a V-belt driving device, and more particularly to a drive for transmitting rotation of a driving shaft to a driven shaft by sheaves or pulleys having an asymmetric conical running surface for use with a correspondingly shaped asymmetric V-belt.

BACKGROUND

There are known, for instance from U.S. Pat. No. 2,797,587, drives of the general kind above referred to in which the driving shaft and the driven shaft each seat a pulley or sheave composed of two halves. One half of each sheave is secured on its shaft against rotation and axial displacement and the other half of each sheave is rotatable and axially displaceable on its shaft. Suitable biasing means such as springs bias the axially displaceable sheave halves toward the other sheave halves. By providing such freely rotatable and axially displaceable sheave halves resetting of the sheave on the driven shaft can be effected in a simple manner for correctly adjusting the tension of the belt between the sheave halves.

In drives as now known the freely rotatable sheave halves are disposed in opposition with respect to plane in which the belt runs. As a result, the tension lines within the belt are at a slant whereby the belt has a tendency to run deeper in the driving sheave due to exerting a lateral pressure upon one half of this sheave. This causes a change in the transmission ratio and also deformation of the V-belt which becomes permanent after a prolonged time of use of the belt. Moreover, the efficiency of the power transmission is adversely affected.

Various attempts have been made to eliminate the afore-indicated disadvantages—for instance German Publication Pat. application DAS No. 1,248,384 discloses a pulley or sheave for a V-belt drive in which the movement of the two sheave halves relative to each other is limited. While such arrangement eliminates one problem, it creates a new problem in that the V-belt between the halves of the sheaves is subjected to an asymmetric load.

THE INVENTION

A broad object of the invention resides in a V-belt drive which retains the advantages of the afore-discussed V-belt drives as are obtained by sheaves including a half which is freely rotatable on its shaft (such as low service requirements and high operational liability by the possibility of using bearing bushings which are corrosion-resistant and show little wear and tear), and which additionally have the advantage that they are, with respect to temperature and stresses on the belt as caused by the tension thereof, at least equal to V-belt drives in which both halves of the sheaves are secured against rotation on the shafts.

There are also known gradually variable V-belt drives in which the sheave halves defining therebetween conical running surfaces for the V-belt which have different angles thereby forming an asymmetric running surface for the belt. The sheave halves having the same angle relative to the respective shaft are disposed on the same side of the respective running surface of the V-belt and are secured on the shafts against rotation and axial displacement. V-belt drives of this type are disclosed, for instance in Swiss Pat. No. 434,918.

It is a further object of the invention to provide an asymmetric V-belt drive in which the V-belt is subjected to an equal load across its cross-section, thereby avoiding a deformation of the belt. The has the advantage that deformation of the belt causing increases of temperature are avoided and thus loss of effectiveness of the belt.

The invention also provides that by using a bushing which requires virtually no servicing in the hubs of the freely rotatable sheave halves, the overall service requirements of the bearings for the sheaves are greatly reduced. Bushings of this kind preferably consist of layers of metal and plastic materials which are corrosion-resistant. As a result of this arrangement both the V-belt or the sheaves therefor have a very long useful life at a minimum of servicing costs. It has been found that drives according to the invention can be run for a much longer period of time without any servicing than is possible with V-belt drives as are now known.

DETAILED DESCRIPTION OF THE INVENTION

In the accompanying drawing, preferred embodiments of the invention are shown by way of illustration and not by way of limitation.

Figure 1:
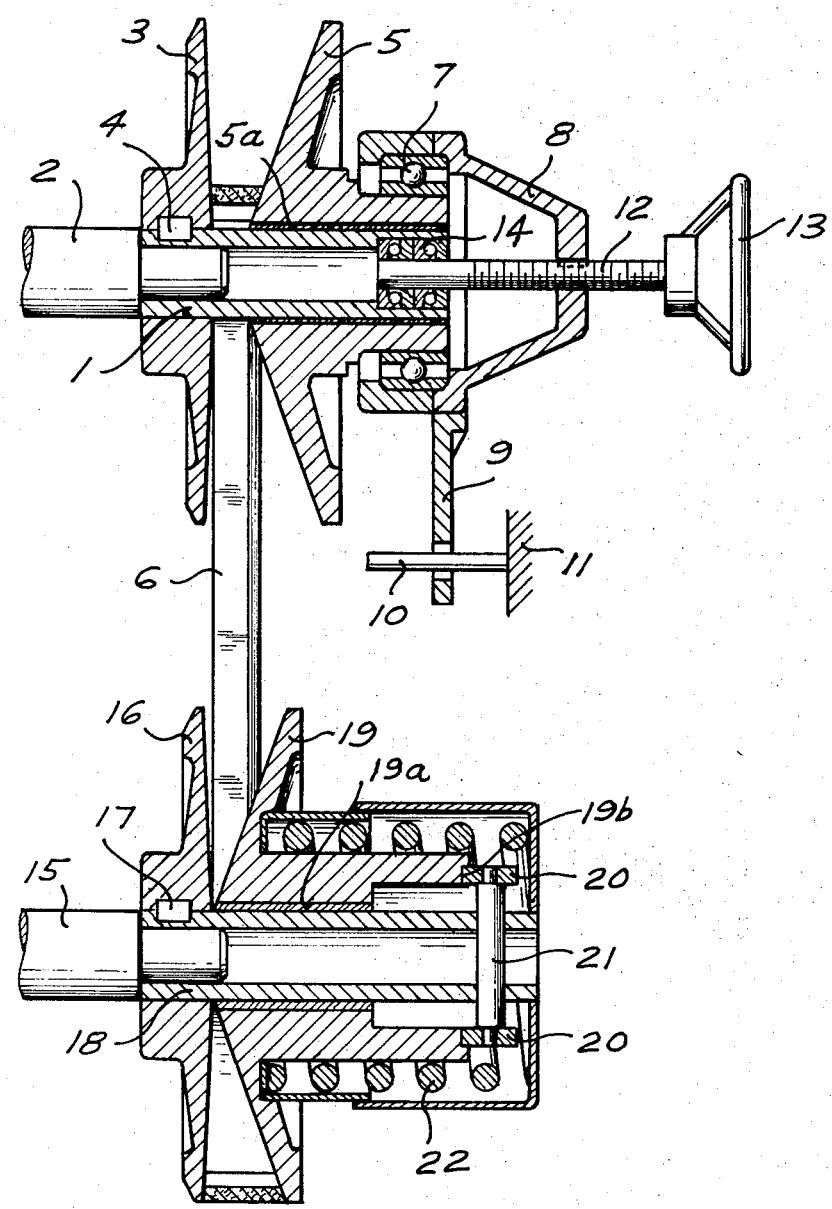
FIG. 1 is a sectional elevational view of a gradually variable V-belt for an asymmetric V-belt.

Referring now to the figures more in detail, and first to FIG. 1, the V-belt drive as exemplified in this figure comprises a driving or input shaft 2 mounting a bushing 1. This bushing seats one half 3 of a sheave having a conical running surface. The sheave half 3 is keyed by a suitable key means such as a spring 4 of bushing 1, thereby securing the sheave half against rotation and axial displacement. The running surface of sheave half 3 defines a narrow acute angle with shaft 2. An angle of 1° to 5° has been found to be essential for the operation of the drive. A second sheave half 5 is seated on a bushing 5a freely rotatable and axially slidable thereon. Bushing 5a in turn is also seated on bushing 1. It preferably consists of several layers of materials such as metal and plastic which do not require servicing and are press-fitted into the bore of sheave half 5. Self lubricating bushings of this kind are known, for instance, from U.S. Pat. No. 2,711,103.

The second sheave half 5 is slanted with a larger acute angle than sheave half 2, namely an angle of 15° to 25°. As it is apparent, the two halves constitute a sheave having a conical asymmetric running surface for a V-belt 6, the sides of whcih are correspondingly asymmetric.

Setting of sheave half 5 and thus a gradual variation of the running space for asymmetric V-belt 6 between the two sheave halves 3 and 5 is effected by means of a suitable setting device shown as comprising a ball bearing 7 which in turn is journaled on the hub of sheave half 5 and a setting member 8. This member is mounted on a bracket 9 which is lengthwise displaceable thereon, but fixed in radial direction by a bolt 10 which in turn is secured to a fixed support 11. The setting of collar 8 can be adjusted by means of a spindle bar 13. The spindle bar abuts against the bushing 1 via a ball bearing 14.

Figure 2:
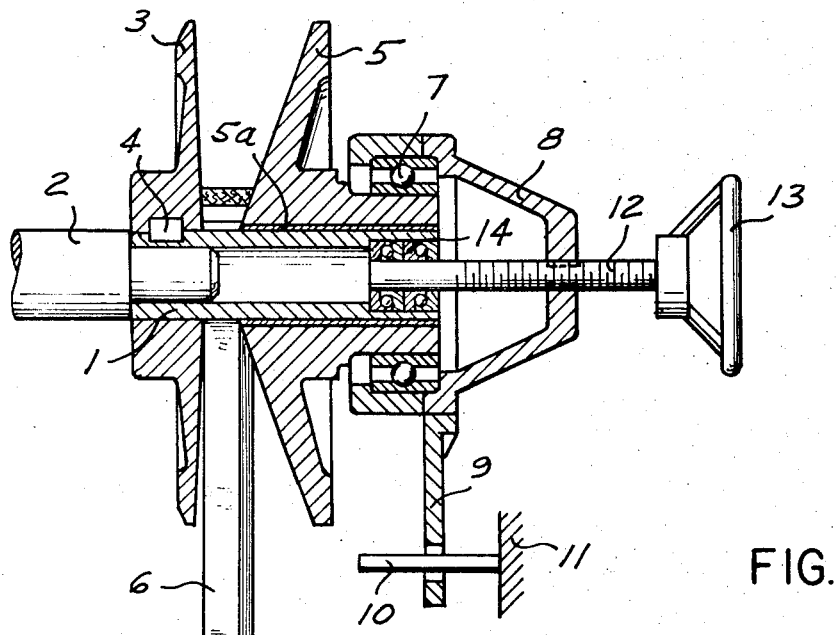
FIG. 2 is an elevational sectional view of a modification of the V-belt drive according to FIG. 1.

FIG. 2 shows the same driving or input assembly as FIG. 1. Accordingly, the same reference numbers are used to indicate corresponding parts.

The driven or output assembly of FIG. 1 comprises a driven shaft 15 which supports a sheave half 16 keyed to a fixed bushing 18 by means of suitable key means such as spring 17. A second sheave half 19 with its bushing 19a is rotatable and axially displaceable relative to shaft 15. Bushing 19a is preferably made of several layers pressfitted into the sheave half bore; bushings of this kind require very little if any servicing.

Sheave halves 16 and 19 form a second sheave with a conical running surface. The running surface of sheave half 16 defines a narrow acute angle relative to shaft 15 and sheave half 19 defines a larger acute angle so that the running surface defined by the two facing surfaces of the sheave is asymmetric. The angle relation of sheave halves 16 and 19 is the same as defined for sheave halves 3 and 5. As it is apparent from FIG. 1, the sheave halves of the two sheaves are disposed in alignment in respective planes.

Sheave half 19 includes a hub which is arranged, for instance as a turning moment or torque curved camming surface 19b. While sheave half 5 is not in any way coupled to shaft 2 or bushing 1, sheave half 19 is driven by follower rollers 20 which protrude into the path of camming surface 19b as the same rotates. The rollers 20 are loosely rotatable on a bolt 21 which is mounted crosswise of bushing 18 extending into the same. The abutment of the two rollers 20 against the torque or turning moment camming surface 19b depends on the load and serves as automatically acting tensioning device for the belt. A light pressure of a spring 22 presses the sheave half 19 against V-belt 6 thereby producing the belt tension required in accordance with the momentary load to be transmitted. Such load-depending or turning moment controlled tensioning device serves in this arrangement also as a coupling between the driven shaft and its sheave.

The components of the driven or output assembly as shown in FIG. 2 comprise a coupling assembly in the form of a friction coupling which is so arranged that the sheave half 24 when pressed by compression springs 23 against V-belt 6 abuts against a sheave half 27 keyed by suitable key means such as a spring 25 on its bushing. The angle relation of sheave halves 27 and 24 is the same as that of sheave halves 16 and 19.

The hub of sheave half 24 is keyed to a bushing 24a which is a multiple layer and practically servicing-free bushing. The sheave half 24 is rotatable on bushing 26 and also axially displaceable thereon, but no coupling means of any kind is provided. The sheave half 24 is carried along only by the pressure of springs 23. These springs also serve to produce the required pretensioning of the V-belt. They are disposed in a sleeve-shaped extension 24b of sheave half 24 and cup-shaped housing 30 slidable on extension 24b.

The abutment of springs 23 against a counter abutment can be effected either by:
a. an axial bearing or a thrust bearing;
b. a slip clutch 28.

By observation during operation (that is, by means of a stroboscope when the drive is running,) it can be clearly ascertained that both sheave halves (sheave half 5 at the input side and sheave half 24 on the output side) according to FIG. 2, lag exactly by the amount of the slippage of the V-belt between 0 to 1 percent depending on the load relative to the sheave halves 3 and 27, respectively, (and also relative to bushings 1 or 26), irrespective whether the pressure springs 23 are supported by an axial ball bearing or a slip clutch.

Figure 3:
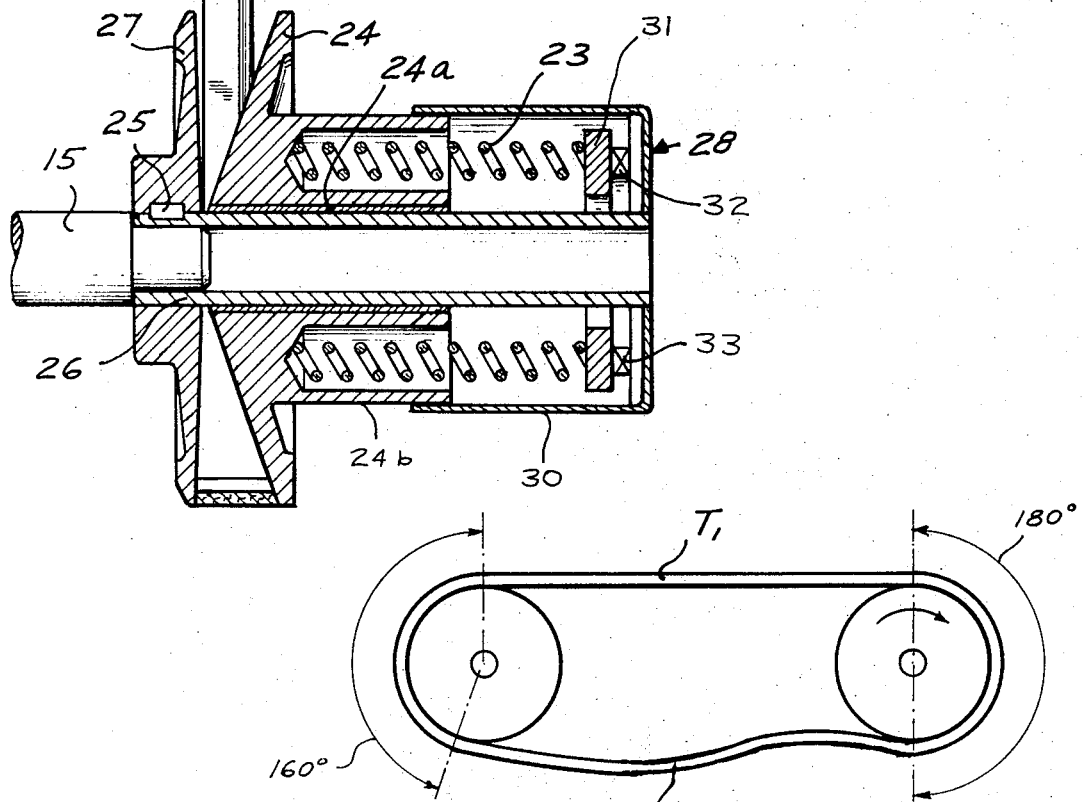
FIG. 3 is a diagrammatic view of the V-belt drive according to FIGS. 1 or 2.

The abutment pressure and the effective transmission surfaces on the sides of the V-belt are different in spite of equal pretensioning of the belt, (in the example a uniform running diameter is assumed to facilitate understanding) as it is apparent from FIG. 3. As the belt runs in the conical running groove defined by sheave halves 3 and 5, the driving belt side $I_1$ seats itself tighter in the running groove of the driving assembly than the idling belt side $T_2$ seats itself in the running surface defined by sheave halves 16 and 19 of the output assembly. As a result, there is formed in the driving or input assembly an effective covering angle for the belt of about 180° and in the output or driven assembly an effective covering angle of about 150° to 170°, depending upon the ratio of the tension of the working and idling belt parts $T_1/T_2$.

For symmetric drives $Thd\ 1/T_2 \approx 3:1$

For asymmetric drives $T_1/T_2 \approx 5.5:1$ to $6:1$

These ratios are favorably affected or resolved when in accordance with the invention the sheave halves 19 and 24, respectively, are freely rotated during the operation of the drive under load.

The use of a slip clutch 28 as counter bearing as shown in FIG. 2 has an advantage that part of the turning moment or torque is transferred from sheave half 24 to bushing 26. As shown, slip clutch 28 comprises a ring 31 loose on bushing 26 and also constituting an abutment for springs 23, an abutment ring 32 secured to the bushing and spring housing 30 and a slip ring 33 made of a suitable material such as the material used for bushings 5a and 19a. The pressure of springs 23 presses ring 31 against ring 33 which in turn is pressed against abutment 32, thus providing a slip clutch.

The sheave halves 3, 16 and 3, 27, respectively, which are fixedly keyed to the shafts are located on the same side of V-belt 6. The arrangement of a V-belt drive according to the invention has the advantage that coupling means such as keys, follower rollers, etc., are reduced in number. The drive also has the advantage that it is fully reliable, requires practically no servicing and has a long useful life both on the input or driving side and the output or driven side.

Tests carried through a long period of time have shown that even with high loads such as more than $N = 100$ PS the slippage of the V-belt still remains below 1% and that the temperature elevation of the V-belt is well below acceptable temperatures. The V-belt itself has at least the same useful period of life as it has when used with V-belt drives of conventional design.

The afore-described construction principle is, of course, applicable to sets of sheaves or pulleys with conical running surfaces which consist of a fixedly mounted sheave and a set of sheave halves which can be gradually adjusted by varying the spacing between the halves. It is further useful for drives in which a positive adjustment for both pairs of sheaves is provided, that is, of all four sheave halves. Finally, it should be pointed out that the term 'V-belt' as used herein also applies to V-chains.

What is claimed is:

1. A driving device for an asymmetric V-belt, said device comprising in combination:

a drive shaft and a driven shaft disposed in spaced apart parallel relationship;

a sheave having a conical running surface seated on each of said shafts, each of said sheaves being composed of two halves, one half of each sheave being rotatably and axially fixed on the respective shaft, the other half of each sheave being freely rotatably and axially displaceably seated, the facing sides of the sheave halves defining different acute angles relative to the shafts, said angles constituting asymmetric running surfaces for a V-belt, the sheave halves defining the smaller angle relative to the shafts facing in the same direction, said fixed sheave halves being disposed in planar alignment and said rotatable and axially slidable sheave halves being also disposed in planar alignment;

a biasing means for each of the sheaves, each of said biasing means biasing the respective freely rotatable and axially displaceable sheave half toward the respective fixed sheave half; and setting means for each of the sheaves, each of said setting means coacting with the respective biasing means for varying the biasing pressure thereof.

2. The driving device according to claim 1 wherein the rotatable and axially displaceable sheave half on the driven shaft is coupled to said shaft by load responsive slip clutch means.

3. The driving device according to claim 1 wherein the facing side of the fixed sheave halves has an angle of 1° to 5° relative to the respective shaft and the facing side of each of the rotatably and axially displaceably seated sheave halves has an angle of 15° to 25° relative to the respective shaft.

4. The driving device according to claim 1 wherein each of the rotatable and axially displaceable sheave halves is mounted on a hub member including a bushing made of corrosion-resistant layers of metal and plastic material.

* * * * *